(12) United States Patent
Kim

(10) Patent No.: US 7,130,483 B2
(45) Date of Patent: Oct. 31, 2006

(54) METHOD FOR ENHANCING A DIGITAL IMAGE WHILE SUPPRESSING UNDERSHOOTS AND OVERSHOOTS

(75) Inventor: Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 630 days.

(21) Appl. No.: 10/021,148

(22) Filed: Dec. 12, 2001

(65) Prior Publication Data

US 2002/0067862 A1 Jun. 6, 2002

(51) Int. Cl.
*G06K 9/40* (2006.01)

(52) U.S. Cl. .................. 382/266; 382/132; 382/264; 382/275

(58) Field of Classification Search .............. 382/254, 382/263, 266–269, 275
See application file for complete search history.

(56) References Cited

U.S. PATENT DOCUMENTS

| | | | | |
|---|---|---|---|---|
| 5,038,388 A | * | 8/1991 | Song | 382/266 |
| 5,050,223 A | * | 9/1991 | Sumi | 382/266 |
| 5,880,767 A | * | 3/1999 | Liu | 347/251 |
| 5,930,402 A | | 7/1999 | Kim | |
| 6,014,474 A | * | 1/2000 | Takeo et al. | 382/308 |
| 6,055,340 A | * | 4/2000 | Nagao | 382/261 |
| 6,125,214 A | * | 9/2000 | Takeo et al. | 382/308 |
| 6,125,215 A | * | 9/2000 | Takeo et al. | 382/308 |
| 6,137,923 A | * | 10/2000 | Takeo et al. | 382/308 |
| 6,169,823 B1 | * | 1/2001 | Takeo et al. | 382/308 |
| 6,233,362 B1 | * | 5/2001 | Takeo et al. | 382/266 |
| 6,252,995 B1 | * | 6/2001 | Takamori | 382/254 |
| 6,285,798 B1 | * | 9/2001 | Lee | 382/260 |
| 6,373,992 B1 | * | 4/2002 | Nagao | 382/266 |
| 6,611,627 B1 | * | 8/2003 | LaRossa et al. | 382/240 |
| 6,628,842 B1 | * | 9/2003 | Nagao | 382/266 |
| 2001/0046320 A1 | * | 11/2001 | Nenonen et al. | 382/169 |
| 2003/0081854 A1 | * | 5/2003 | Deshpande | 382/261 |

OTHER PUBLICATIONS

Scognamiglio, G. Ramponi, G. Rizzi, A. Albani, L. ,"A Rational Unsharp Masking Method for TV Applications", Oct. 24-28, 1999, IEEE Image Processing, 1999. ICIP 99. Proceedings, pp. 247-251 vol. 4.*

Lee, H.C., Cok, D.R., "Detecting Boundaries in a Vector Field", 1991, Signal Processing, IEEE Transactions on see also Acoustics, Speech, and Signal Processing, IEEE Transactions on, ISSN: 1053-587X.*

(Continued)

*Primary Examiner*—Bhavesh M. Mehta
*Assistant Examiner*—Sath V. Perungavoor
(74) *Attorney, Agent, or Firm*—Kenneth L. Sherman, Esq.; Michael Zarrabian, Esq.; Myers Dawes Andras & Sherman, LLP

(57) ABSTRACT

A method is provided for enhancing the details of an image while suppressing or preventing shoots that would otherwise occur during a prior art enhancement process. The enhancing method is based on recognizing that Shoots are likely to occur at edges of an image to be enhanced, and therefore, if the enhancement is sufficiently reduced or even possibly eliminated at the edges of the image, the Shoots that would otherwise occur will be suppressed or even possibly eliminated. A gain suppressing function is used to attenuate the enhancement at the edges of the image. Preferably, the gain suppressing function inherently identifies the edges of the image to be enhanced.

13 Claims, 5 Drawing Sheets

OTHER PUBLICATIONS

Cheikh, F.A., Gabbouj, M., "Directional-Rational Approach for Color Image Enhancement", 2000, Circuits and Systems, 2000. Proceedings. ISCAS 2000 Geneva. The 2000 IEEE International Symposium on, INSPEC Accession No. 6754532.*

Carrato, S., Sicuranza, G.L., Ramponi, G., "A Gradient-Directed Unsharp Masking Algorithm for Synchrotron Radiation Angiography", 1989, Electrotechnical Conference, 1989. Proceedings., INSPEC Accession No. 3544343.*

*Fundamentals of Digital Image Processing*, Jain, Anik K., Prentince Hall, 1989, p. 249.

*Two Dimensional Signal Processing and image Processing*, Lim, Jae S., Prentice Hall, 1990, p. 459.

\* cited by examiner

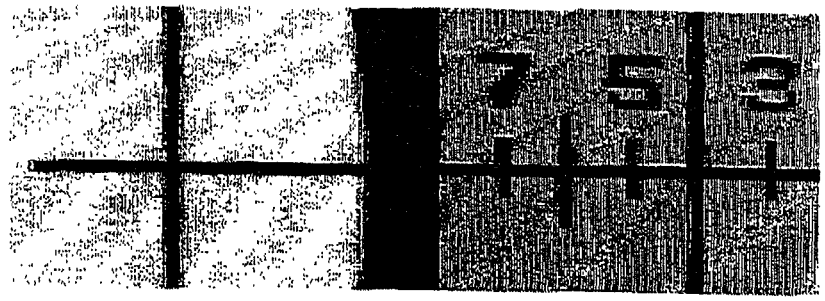
FIG. 2A
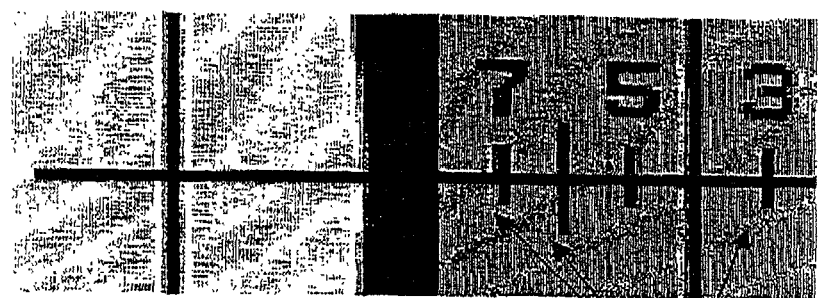
PRIOR ART
FIG. 2B
Overshoots
FIG. 3

$x(m,n)$ is small
$v(m,n)$ is small $x(m,n)$ is large
$v(m,n)$ is small $x(m,n)$ is small
$v(m,n)$ is large $x(m,n)$ is large
$v(m,n)$ is large

METHOD FOR ENHANCING A DIGITAL IMAGE WHILE SUPPRESSING UNDERSHOOTS AND OVERSHOOTS

BACKGROUND OF THE INVENTION

Field of the Invention

The present invention relates to a method for enhancing a digital image while suppressing or preventing undershoots and overshoots that normally occur as a result of such enhancement.

There are many ways of acquiring digital images based on current technologies. For example, digital images can be obtained with a digital camera, with a scanner, or can be downloaded from the Internet. Video signal capturing systems also provide ways of getting digital image samples or video samples. Digital images are also internally available and processed in some multimedia devices such as DVD players and Digital TV systems.

Images tend to degrade for various reasons, and in order to obtain better quality, these images need to be enhanced. Many image enhancement processes are known and a particular one of these processes can be selected depending upon the degradation characteristics of an image. Local contrast enhancement enhances the visual cue of a given image and is also referred to as detail enhancement. The fundamental concept behind detail enhancement is to emphasize the high frequency components that are embedded in the image so that the visual appearance of the image can be sharpened or can appear more vivid to a human being.

The most commonly used methods of detail enhancement are based upon unsharp masking. Examples of unsharp masking can be found by referring to the following references, which are incorporated herein by reference: Jain, Anil K. *Fundamentals of Digital Image Processing*, Prentice Hall, 1989. p. 249; and Lim, Jae S. *Two Dimensional Signal Processing and Image Processing*, Prentice Hall, 1990. p. 459. A more complex method of enhancement is disclosed in Kim, Yeong-Taeg (U.S. Pat. No. 5,930,402) *Method and Device for Local Contrast Enhancement of Video Signal*, which is also incorporated herein by reference.

Most detail enhancement methods are associated with a problem known as overshoot and undershoot that occurs as the result of the enhancement. Overshoot and undershoot are visually annoying and undesirable. For example, FIG. 1A shows digital image samples that can represent either a vertical edge or a horizontal edge. If a typical detail enhancement method is applied to these samples, the result is as shown in FIG. 1B. Note that the slope has been increased, and therefore, the edge has been sharpened around the center of the edge. However, it should be also observed that overshoot and undershoot (the circled areas) are also present in the enhanced image samples shown in FIG. 1B, and as previously mentioned, this overshoot and undershoot are visually annoying and undesirable if the image is going to be displayed with a display device, such as, for example, a television. Overshoot and undershoot will hereinafter be referred to as "Shoots". A desirable enhancement result might be the one shown in FIG. 1C in which the Shoots have been mitigated. The visual impact of such Shoots is demonstrated in FIGS. 2A and 2B. FIG. 2A shows a degraded input image and FIG. 2B shows the result of detail enhancement utilizing unsharp masking that is based on a horizontal high-pass filter. The overall detail or sharpness has been increased significantly in the image shown in FIG. 2B, but the image clearly shows that Shoots resulting from the detail enhancement process are visually undesirable and annoying. In general, the effect becomes more visible and annoying if the image is displayed on a large display device such as a large screen television set.

Hence, it is highly desirable to suppress or prevent the occurrence of the Shoots, causing visually annoying effects, while enhancing the details of an image.

SUMMARY OF THE INVENTION

It is accordingly an object of the invention to provide a method for enhancing the details of an image while suppressing or preventing shoots that would otherwise occur during a prior art enhancement process.

The enhancing method is based on recognizing that Shoots are likely to occur at edges of an image to be enhanced, and therefore, if the enhancement is sufficiently reduced or even possibly eliminated at the edges of the image, the Shoots that would otherwise occur will be suppressed or even possibly eliminated. A gain suppressing function is used to attenuate the enhancement at the edges of the image. Preferably, the gain suppressing function inherently identifies the edges of the image to be enhanced.

With the foregoing and other objects in view there is provided, in accordance with the invention, a method for enhancing an image, that includes steps of: obtaining a first image signal including pixel values; obtaining a high-pass image signal having high-frequency components of the first image signal; obtaining a positive non-zero weighting factor to control a degree of enhancement; selecting edge pixel values representing a boundary of an edge in the first image; for suppressing shoots, defining a gain suppressing function having attenuation coefficients to be multiplied with particular pixel values of the high-pass image signal corresponding in location to the edge pixel values; multiplying the high-pass image signal by the weighting factor and by the gain suppressing function to obtain a result; and adding the result to the first image signal to obtain an enhanced image signal in which the shoots have been suppressed.

In accordance with an added feature of the invention, the selecting step is performed by evaluating two independent boundary-indicating functions and concluding that a given one of the pixel values of the first image represents the boundary of the edge only if both of the two functions indicate that the given one of the pixel values is on the boundary.

BRIEF DESCRIPTION OF THE DRAWINGS

FIG. 2A shows a degraded image;

FIG. 2B shows the image of FIG. 2A after undergoing a prior art detail enhancement process;

FIG. 3 shows the representation of a digital image by an M×N array of digital pixels;

DESCRIPTION OF THE PREFERRED EMBODIMENTS

The present invention will first be described in relation to a method for enhancing a digital image while preventing or suppressing the occurrence of Shoots in the horizontal direction. However, the invention is also applicable to enhancing the digital image while preventing or suppressing the occurrence of shoots in the vertical direction.

For systematically describing the present invention, some mathematical notations will be introduced. When acquiring digital image samples, it is typical to model the digital image as a two-dimensional signal having horizontal and vertical indices where the functional value corresponds to the pixel value. That is, suppose that $\{f\}_{M\times N}$ represents a digital image or a digital picture composed of M×N digital pixels in which M and N represent the height (the number of the samples in the vertical direction, or the number of the lines) and the width (the number of the samples in horizontal direction), respectively. Then f (m,n) represents the n th pixel value of the m th line of the input image, $\{f\}_{M\times N}$. This relationship is depicted in FIG. 3.

Figure 4:
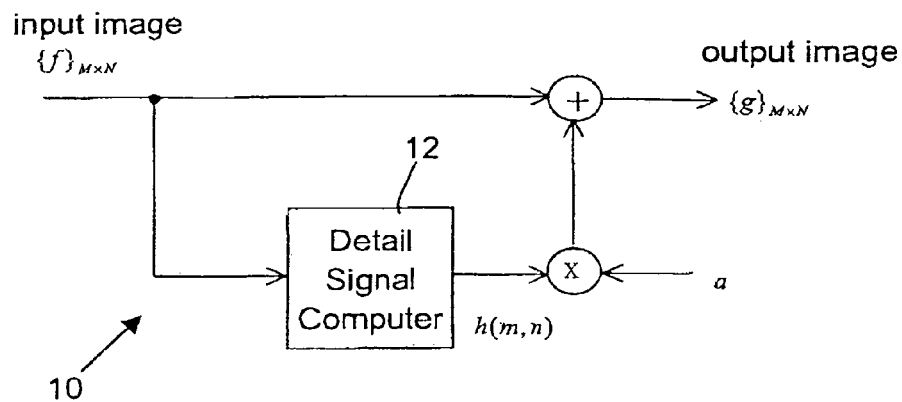
FIG. 4 shows a prior art detail enhancing circuit.

A more thorough description of detail enhancement based on unsharp masking can be found by referring to the references mentioned in discussing the background of the invention. The unsharp masking process is based on adding a signal proportional to the gradient, or a high-pass signal, to the given image. This is process is illustrated in FIG. 4, which shows a prior art detail enhancing circuit 10 with a detail signal computer 12 that provides a high-pass filtered image of the input image. In general, the unsharp masking operation can be written as:

$$\{g\}_{M\times N}=\{f\}_{M\times N}+a\cdot\{h\}_{M\times N}$$

where $\{g\}_{M\times N}$ represents the output image, $\{h\}_{M\times N}$ represents a high pass filtered image of $\{f\}_{M\times N}$, and a is a predetermined non-zero positive constant (weighting factor) that controls the degree of enhancement.

The unsharp masking process can be equivalently expressed as a pixel by pixel process such that $$g(m,n)=f(m,n)+a\cdot h(m,n) \quad (1),$$

where g(m,n) and h(m,n) represent the pixel values of $\{g\}_{M\times N}$ and $\{h\}_{M\times N}$, respectively, for m=1,2, . . . ,M and n=1,2, . . . ,N. Note from (1) that the high frequency components of the input image are added to itself so that details of the image composed of the high frequency components are amplified as a consequence. The overall characteristic of the unsharp masking process is solely dependent on the design of the high pass filter and on the value of the constant a, which is known as the enhancement gain control parameter.

Methods of designing and analyzing high-pass filters are well-known in the art of image or video signal processing, and therefore such methods will not be discussed in depth in this disclosure. The previously cited documents, "Fundamentals of Digital Image Processing", and "Two Dimensional Signal Processing and Image Processing", can also be referred to for information on this topic.

Some basic examples of high-pass filters will be given. As a first example, a high-pass filter can be expressed as:

$$h(m,n)=f(m,n)-(f(m,n-1)+f(m,n+1))/2 \quad (2),$$

which represents a horizontal high pass filter meaning that only the horizontal gradient is taken into account. Similarly, a vertical high-pass filter can be expressed as:

$$h(m,n)=f(m,n)-(f(m-1,n)+f(m+1,n))/2 \quad (3).$$

A 2-dimensional high-pass filter can be expressed as:

$$h(m,n)=f(m,n)-(f(m,n-1)+f(m,n+1)+f(n-1,m)+f(n+1,m))/4 \quad (4),$$

which is associated with the average change of the signal in the horizontal and the vertical directions around the sample location at (m,n).

The fundamental role of h(m,n) in (1) is to estimate the local contrast or the local detail of the image. One can use a more sophisticated method for estimating the details of the image, such as, the method disclosed in U.S. Pat. No. 5,930,402, for example. In other words, the current invention is not limited to any particular method of obtaining h(m,n), because the main object of the present invention is to suppress or prevent the overshot/undershoot inherently arising in detail enhancement methods. The present detail enhancement method, which suppresses or prevents Shoots can be used, for better detail enhancement, in combination with any possible method of obtaining high-frequency components of the image.

Figure 5:
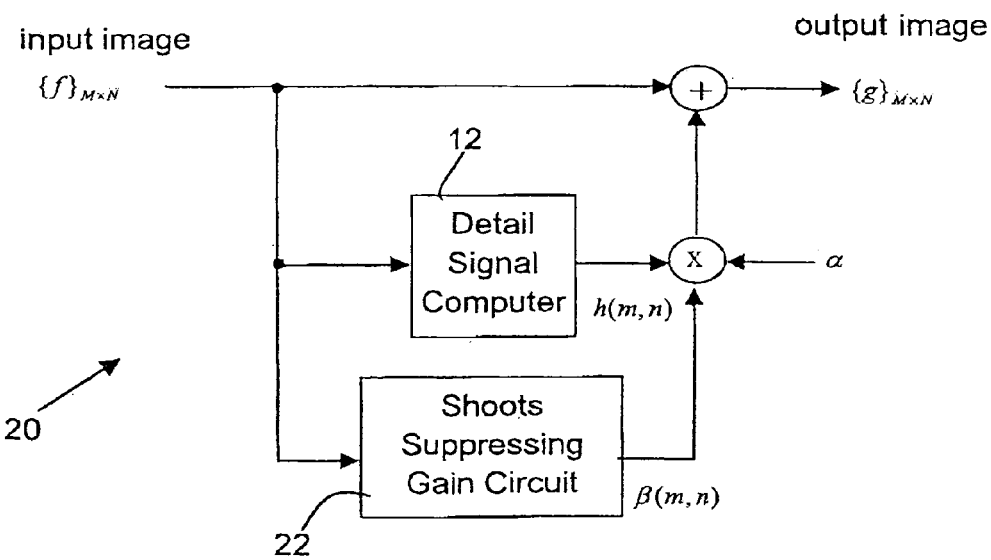
FIG. 5 shows a detail enhancement circuit that suppresses or prevents shoots.

FIG. 5 shows a detail enhancement circuit 20 for performing the inventive method of detail enhancement that suppresses or prevents Shoots. The enhanced output signal is given as:

$$g(m,n)=f(m,n)+\beta(m,n)\cdot a\cdot h(m,n) \quad (5),$$

where β(m,n) is the Shoot suppressing gain function (0≦β(m,n)≦1), which varies from pixel to pixel depending on the characteristic of the signal at (m,n), and where a·h(m,n) is the general enhancement term. FIG. 5 shows a shoot suppressing gain circuit 22 for generating the Shoot suppressing gain function β(m,n) in a manner that will be discussed below. The detail signal computer 12 has already been discussed in regard to FIG. 4.

The role of the Shoot suppressing gain function in (5) is to adjust the degree of enhancement in order to suppress Shoots when necessary. That is, when it is estimated that Shoots are likely to occur, the value of β(m,n) is made smaller so that the impact of the enhancement can be minimal. Note that the output signal shown in FIG. 5 simplifies to g(m,n)=f(m,n) if β(m,n)=0, which means no change or no enhancement is made for the input image. On the contrary, when it is estimated that Shoots are not likely to occur, the value of β(m,n) is made larger so that the input image is enhanced. Note that that the output signal of the process in FIG. 5 simplifies to g(m,n)=f(m,n)+a·h(m,n) if β(m,n)=1, in which case, the input image is fully enhanced by a·h(m,n). Hence, the fundamental process behind (5) and the enhancement circuit shown in FIG. 5 is using the Shoot suppressing gain function to adjust the degree of enhancement in dependence upon whether or not it is estimated that shoots are likely to occur.

Figure 1A:
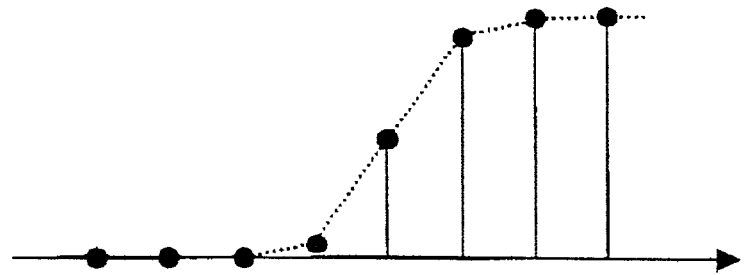
FIG. 1A shows digital image samples that represent an edge.
Figure 1B:
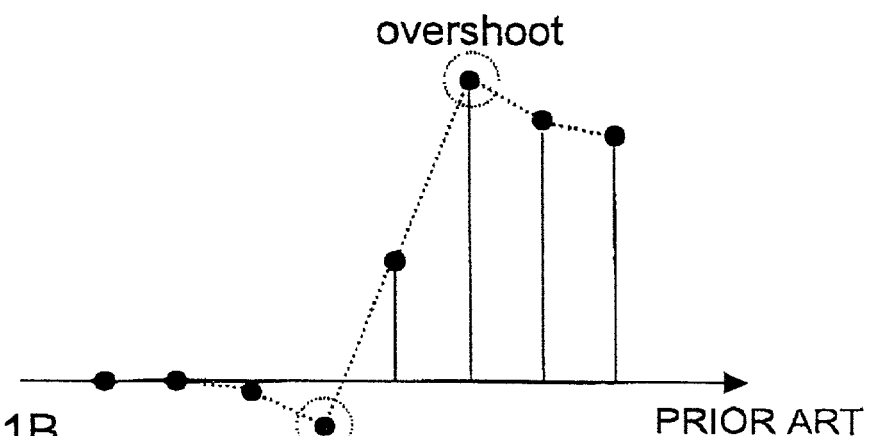
FIG. 1B shows the digital image samples of FIG. 1A after undergoing a prior art detail enhancement process.
Figure 1C:
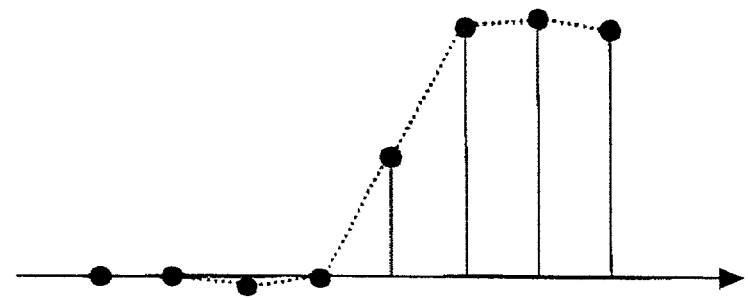
FIG. 1C shows the digital image samples of FIG. 1A after undergoing a desirable detail enhancement process.

Now, we turn to the problem of computing the Shoot suppressing gain function β(m,n), at the presence of the incoming input samples in order to realize the detail enhancement operation with Shoot suppression in (5). Hence, the fundamental question is how to estimate the probability that Shoots are likely to occur when performing an enhancement process. Close observation of the occurrence of Shoots leads one to conclude that Shoots typically occur at the boundary of an edge as shown in FIG. 1B and in FIG. 2B.

Hence, we turn to the problem of developing a method for detecting the boundary of an edge and generating an associated Shoot suppressing gain function $\beta(m,n)$ that can be used for performing the enhancement process described by (5) and shown in FIG. 5. To arrive at such a Shoot suppressing gain function $\beta(m,n)$, the following quantity is computed:

$$d(m,n) = \min(f_L(m,n), f_R(m,n)) \quad (6),$$

where $$f_L(m,n) = |f(m,n) - f(m,n-1)| \quad (7),$$

and $$f_R(m,n) = |f(m,n) - f(m,n+1)| \quad (8).$$

In order to normalize d, the following quantity is computed:

$$x(m,n) = \begin{cases} \left(\frac{d(m,n)}{D}\right)^J, & \text{if } d(m,n) \le D \\ 1, & \text{otherwise,} \end{cases} \quad (9)$$

where D and J are predetermined positive non-zero constants. Note, it is likely that the sample f(m,n) is located at the boundary of an edge as the value of x(m,n) approaches 0. Note also, however, the fact that the value of x(m,n) approaches 0 does not necessarily indicate that the sample f(m,n) is located at the boundary of an edge. A small value of x(m,n) can also be obtained around a constant area in which both values of $f_L(m,n)$ and $f_R(m,n)$ are small. Hence, it is not sufficient to determine whether or not the current input sample f(m,n) is located at the boundary of an edge based only on x(m,n).

To compensate for the insufficient condition for determining whether the current input sample f(m,n) is located at the boundary of an edge, we investigate the amplitude of a horizontal gradient signal as follows. Let us define the normalized amplitude of a horizontal Laplacian signal as:

$$y(m,n) = \begin{cases} \left(\frac{|\Delta(m,n)|}{H}\right)^K, & \text{if } |\Delta(m,n)| \le H \\ 1, & \text{otherwise,} \end{cases} \quad (10)$$

where H is a predetermined positive non-zero constant value used for normalization, K is a predetermined positive non-zero constant, and $\Delta(m,n)$ denotes a discrete horizontal Laplacian signal that can be approximated as:

$$\Delta(m,n) = (f(m,n+1) - f(m,n)) - (f(m,n) - f(m,n-1)) = f(m,n+1) - 2 \cdot f(m,n) + f(m,n-1).$$

Figure 6:
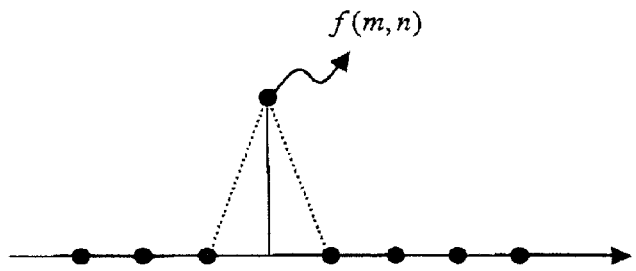
FIG. 6 shows an input sample that is located in the middle of a spike signal.

It is well known that by looking for the zero-crossing points of the Laplacian, the Laplacian can be used for edge detection. For example, reference can be made to the previously cited documents, "Fundamentals of Digital Image Processing", and "Two Dimensional Signal Processing and Image Processing". On the contrary, when the Laplacian has a large amplitude, or equivalently, as the value of y(m,n) approaches 1, this indicates that there is a significant change in the first order difference signals around the sample f(m,n). This implies that it is likely that the sample f(m,n) is located at the boundary of an edge. However, this is not necessarily the case because y(m,n) will also have a large value in the case when the sample f(m,n) is located in the middle of a spike signal, such as, that as illustrated in FIG. 6.

Now, by combining together the conditions explained in (9) and (10), we have a sufficient condition to determine whether the current input sample f(m,n) is located at the boundary of an edge for which the prior art enhancement might introduce Shoot problems. That is, it can be easily asserted that the input sample f(m,n) is located at the boundary of an edge if x(m,n) is approaching 0 and y(m,n) is approaching 1 at the same time. The condition that x(m,n) approaches 0 implies that at least one of the backward or the forward first order sample difference ($f_L(m,n)$ or $f_R(m,n)$) is small, which means that at least one side is a constant region. Therefore, the condition that x(m,n) approaches 0 clearly excludes the case shown in FIG. 6, namely that the sample f(m,n) is in the middle of a spike signal. At the same time, the condition that y(m,n) approaches 1 implies that the sample f(m,n) is either located at the boundary of an edge or in the middle of a spike signal. Therefore, the condition that y(m,n) approaches 1 clearly excludes the case of a constant region. However, because x(m,n) is approaching 0, we have also excluded the case of a spike signal, and therefore, using the two criteria, we have a sufficient condition for concluding that the sample f(m,n) is located at the boundary of an edge.

Figure 7A:
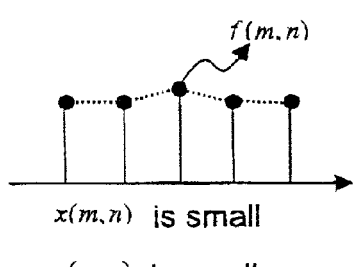
FIGS. 7A–7D show image samples of four possible cases that can be used to better understand the combined condition for detecting the boundary of an edge.
Figure 7B:
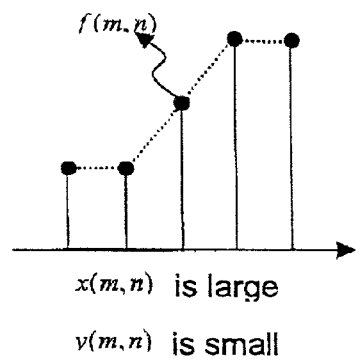
Figure 7C:
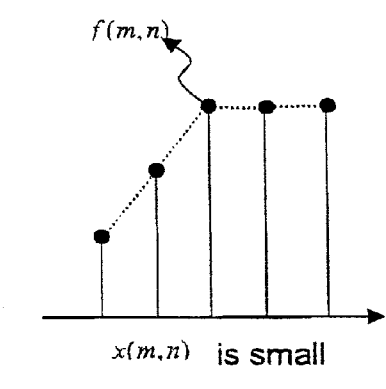
Figure 7D:
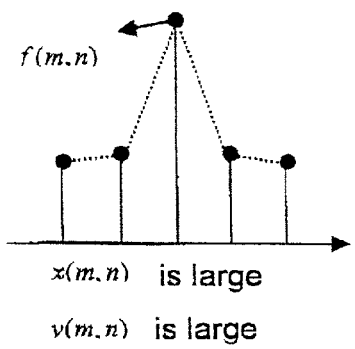

FIGS. 7A–7D show four possible cases that can be used to better understand the combined condition for detecting the boundary of an edge. FIG. 7A shows image samples representing a constant region where both x(m,n) and y(m,n) are small (close to 0). FIG. 7B shows samples of an edge point where x(m,n) is large (close to 1) and y(m,n) is small (close to 0). FIG. 7C shows samples of the boundary of an edge where x(m,n) is small (close to 0) and y(m,n) is large (close to 1). FIG. 7D shows a spike signal where both x(m,n) and y(m,n) are large (close to 1).

Based on the combined conditions, it is now necessary construct the Shoot suppressing gain function $\beta(m,n)$ such that the following boundary conditions are satisfied:

$$\beta \to 1 \text{ as } x \to 0 \text{ and } y \to 0;$$

$$\beta \to 0 \text{ as } x \to 0 \text{ and } y \to 1;$$

$$\beta \to 1 \text{ as } x \to 1 \text{ and } y \to 0; \text{ and}$$

$$\beta \to 1 \text{ as } x \to 1 \text{ and } y \to 1 \quad (11).$$

Figure 8:
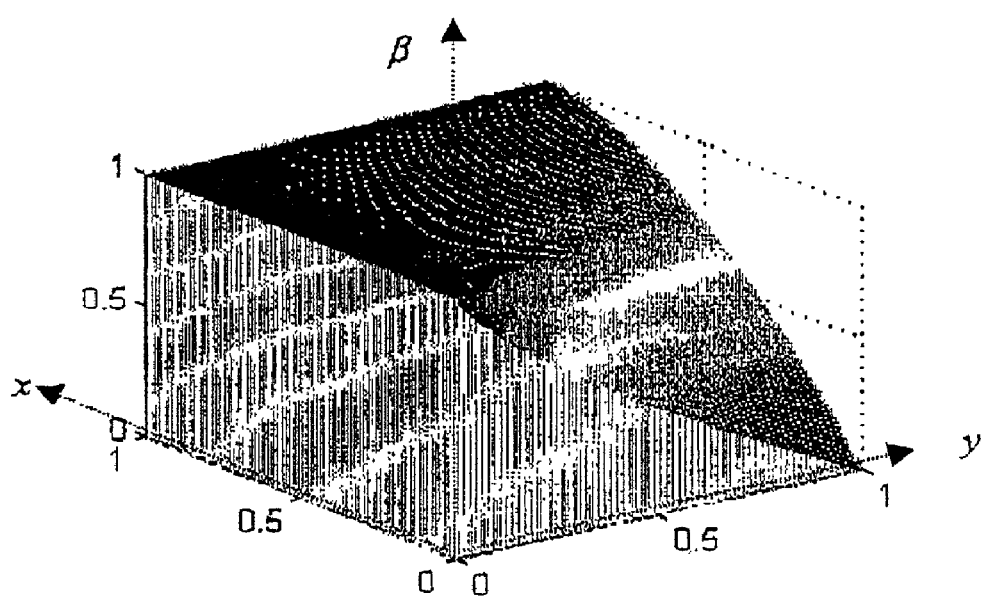
FIG. 8 shows a plot of a first exemplary embodiment of the Shoot suppressing gain function β.

As a first exemplary embodiment of such a function, the Shoot suppressing gain function $\beta$ can be implemented as:

$$\beta(m,n) = \beta(x(m,n), y(m,n)) = 1 - (1 - x(m,n))^p \cdot (y(m,n))^q \quad (12),$$

where p and q are pre-determined constants. FIG. 8 shows a plot of $\beta(x,y)$ where p=1.75 and q=0.75. Note here that the value of $\beta(x,y)$ converges to zero only as x(m,n) and y(m,n) converge to 0 and 1, respectively, which is the condition that the input sample f(m,n) is located at the boundary of an edge.

Some variations of the Shoot suppressing gain function $\beta$ given in (12) can be generated that also have the same convergence characteristic as that specified in (11). For instance, a second embodiment of the Shoot suppressing gain function β has the convergence characteristic specified in (11) and is expressed by:

$$\beta(m,n)=1-(1-x(m,n)^P)\cdot(y(m,n))^q. \qquad (13).$$

It should now be apparent that a shoot suppressing gain function β can also be derived to prevent or suppress the occurrence of Shoots in the vertical direction. The boundary conditions defined in (11) are still applicable and therefore, equations (12) and (13) can also be used in this case. The only differences are that equations (6)–(8) will be modified to operate in the vertical direction before being substituted into equation (9) and a discrete vertical Laplacian signal will be approximated before being substituted into equation (10). The vertically acting equivalents of (6)–(8) are as follows:

$$f_L(m,n)=|f(m,n)-f(m-1,n)|;$$

$$f_U(m,n)=|f(m,n)-f(m+1,n)|; \text{ and}$$

$$d(m,n)=\min(f_L(m,n), f_U(m,n)).$$

The approximation of the discrete vertical Laplacian signal is as follows: $\Delta(m, n)=f(m+1,n)-2\cdot f(m,n)+f(m-1,n)$.

In order to enhance a digital image while suppressing shoots in both the vertical and horizontal directions, both a shoot suppressing gain function $\beta_h$ for suppressing shoots in the horizontal direction and a shoot suppressing gain functions $\beta_v$ for suppressing shoots in the vertical direction can be substituted equation (5) so that $\beta=\beta_v^* \beta_h$.

What is claimed is:

1. A method for enhancing an image, which comprises:
obtaining a first image signal including pixel values;
obtaining a high-pass image signal having high-frequency components of the first image signal;
obtaining a positive non-zero weighting factor to control a degree of enhancement;
selecting edge pixel values representing a boundary of an edge in the first image by evaluating two independent boundary-indicating conditions per pixel, including the steps of: evaluating if at least one side of the pixel is a constant image region, and evaluating if the pixel itself is not in a constant image region, such that if both conditions are satisfied then concluding that the given one of the pixel values of the first image represents the boundary of the edge;
for suppressing shoots, defining a gain suppressing function having attenuation coefficients to be multiplied with particular pixel values of the high-pass image signal corresponding in location to the edge pixel values;
multiplying the high-pass image signal by the weighting factor and by the gain suppressing function to obtain a result; and
adding the result to the first image signal to obtain an enhanced image signal in which the shoots have been suppressed.

2. A method for enhancing an image, which comprises:
obtaining a first image signal including pixel values;
obtaining a high-pass image signal having high-frequency components of the first image signal;
obtaining a positive non-zero weighting factor to control a degree of enhancement;
selecting edge pixel values representing a boundary of an edge in the first image;
for suppressing shoots, defining a gain suppressing function having attenuation coefficients to be multiplied with particular pixel values of the high-pass image signal corresponding in location to the edge pixel values;
multiplying the high-pass image signal by the weighting factor and by the gain suppressing function to obtain a result; and
adding the result to the first image signal to obtain an enhanced image signal in which the shoots have been suppressed;
wherein:
each of the pixel values of the first image signal is represented by f(m, n), where m represents a vertical position and n represents a horizontal position;
a combination of the step of selecting the edge pixel values and the step of defining the gain suppressing function includes calculating:

$$f_L(m,n)=|f(m,n)-f(m,n-1)|;$$

$$f_R(m,n)=|f(m,n)-f(m,n+1)|;$$

$$d(m,n)=\min(f_L(m,n),f_R(m,n)); \text{ and}$$

$$x(m, n) = \begin{cases} \left(\dfrac{d(m, n)}{D}\right)^J, & \text{if } d(m, n) \le D; \\ 1, & \text{otherwise} \end{cases}$$

wherein D and J are predetermined non-negative constants;
a combination of the step of selecting the edge pixel values and the step of defining the gain suppressing function includes calculating;

$$\Delta(m,n)=f(m,n+1)-2\cdot f(m,n)+f(m,n-1); \text{ and}$$

$$x(m, n) = \begin{cases} \left(\dfrac{d(m, n)}{D}\right)^J, & \text{if } d(m, n) \le D \\ 1, & \text{otherwise;} \end{cases}$$

wherein K is a predetermined non-zero constant; and
the gain suppressing function is represented by β (m, n) and has properties defined by:

β→1 as x→0 and y→0;

β→0 as x→0 and y→1;

β→1 as x→1 and y→0; and

β→1 as x→1 and y→1.

3. The method according to claim 2, wherein the gain suppressing function is:

$$\beta(m,n)=\beta(x(m,n),y(m,n))=1-(1-x(m,n))^P\cdot(y(m,n))^q;$$

p and q are predetermined constants.

4. The method according to claim 1, wherein the edge extends in a horizontal direction.

5. The method according to claim 1, wherein the edge extends in a vertical direction.

6. The method according to claim 1, wherein the step of obtaining the high-pass image signal includes filtering the first image signal.

7. The method according to claim 1, wherein the gain suppressing function inherently performs the step of selecting the edge pixel values.

8. A method for enhancing an image, which comprises:

obtaining a first image signal including pixel values;

obtaining a high-pass image signal having high-frequency components of the first image signal;

obtaining a positive non-zero weighting factor to control a degree of enhancement;

selecting edge pixel values representing a boundary of an edge in the first image;

for suppressing shoots, defining a gain suppressing function having attenuation coefficients to be multiplied with particular pixel values of the high-pass image signal corresponding in location to the edge pixel values;

multiplying the high-pass image signal by the weighting factor and by the gain suppressing function to obtain a result; and adding the result to the first image signal to obtain an enhanced image signal in which the shoots have been suppressed;

wherein:

each of the pixel values of the first image signal is represented by f(m,n), where m represents a vertical position and n represents a horizontal position;

a combination of the step of selecting the edge pixel values and the step of defining the gain suppressing function includes calculating;

$f_L(m,n)=|f(m,n)-f(m-1,n)|;$ $f_U(m,n)=|f(m,n)-f(m+1,n)|;$ $d(m,n)=\min(f_L(m,n), f_U(m,n));$ and $$x(m,n) = \begin{cases} \left(\dfrac{d(m,n)}{D}\right)^J, & \text{if } d(m,n) \le D; \\ 1, & \text{otherwise} \end{cases}$$

wherein D and J are predetermined non-negative constants;

a combination of the step of selecting the edge pixel values and the step of defining the gain suppressing function includes calculating:

$\Delta(m,n)=f(m+1,n)-2 \cdot f(m,n)+f(m-1,n);$ and $$y(m,n) = \begin{cases} \left(\dfrac{|\Delta(m,n)|}{H}\right)^K, & \text{if } |\Delta(m,n)| \le H \\ 1, & \text{otherwise;} \end{cases}$$

wherein K is a predetermined non-zero constant; and the gain suppressing function is represented by $\beta(m, n)$ and has properties defined by:

$\beta \rightarrow 1$ as $x \rightarrow 0$ and $y \rightarrow 0;$ $\beta \rightarrow 0$ as $x \rightarrow 0$ and $y \rightarrow 1;$ $\beta \rightarrow 1$ as $x \rightarrow 1$ and $y \rightarrow 0;$ and $\beta \rightarrow 1$ as $x \rightarrow 1$ and $y \rightarrow 1.$ 9. The method according to claim 8, wherein the gain suppressing function is:

$\beta(m,n)=\beta(x(m,n),y(m,n)) = 1-(1-x(m,n))^p \cdot (y(m,n))^q;$ p and q are predetermined constants.

10. The method according to claim 1 wherein the step of defining the gain suppressing function further includes the steps of defining the gain suppressing function having attenuation coefficients to be multiplied with particular pixel values of the high-pass image signal corresponding in location to the edge pixel values, wherein the gain suppressing function is based on the probability of shoot at the edge pixel values.

11. The method according to claim 1 wherein the step of defining the gain suppressing function further includes the steps of defining the gain suppressing function having attenuation coefficients to be multiplied with particular pixel values of the high-pass image signal corresponding in location to the edge pixel values, wherein the gain suppressing function is based on the probability of shoot at the edge pixel values such that the gain suppression function decreases as probability of shoot increases to reduce shoot.

12. The method of claim 1 wherein boundary of an edge is defined by independent boundary-indicating conditions.

13. The method of claim 1, wherein the step of evaluating two independent boundary-indicating functions further includes the steps of: (a) evaluating if at least one of the backward or the forward first order pixel difference is small, indicating that at least one side is a constant region, and (b) evaluating if the pixel itself is not in a constant image region, such that if both functions are satisfied then the pixel is located at the boundary of an edge.

* * * * *